US008493593B2

(12) United States Patent
Ohtani

(10) Patent No.: US 8,493,593 B2
(45) Date of Patent: Jul. 23, 2013

(54) IMAGE FORMING APPARATUS AND IMAGE FORMING SYSTEM

(75) Inventor: Akizou Ohtani, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 758 days.

(21) Appl. No.: 12/499,125

(22) Filed: Jul. 8, 2009

(65) Prior Publication Data

US 2010/0020344 A1 Jan. 28, 2010

(30) Foreign Application Priority Data

Jul. 23, 2008 (JP) ................................ 2008-189471

(51) Int. Cl.
*G06F 3/12* (2006.01)

(52) U.S. Cl.
USPC ......... 358/1.15; 358/1.13; 709/214; 709/217; 705/40

(58) Field of Classification Search
None
See application file for complete search history.

(56) References Cited

U.S. PATENT DOCUMENTS

| | | | | |
|---|---|---|---|---|
| 7,706,008 B2 * | 4/2010 | Fukao et al. | ................ | 358/1.15 |
| 2002/0126322 A1 | 9/2002 | Kadowaki | | |
| 2004/0057068 A1 | 3/2004 | Kadowaki | | |
| 2005/0027197 A1 * | 2/2005 | Segawa et al. | ................ | 600/463 |
| 2005/0270586 A1 * | 12/2005 | Hashimoto | .................. | 358/400 |
| 2007/0053008 A1 | 3/2007 | Kadowaki | | |
| 2008/0170253 A1 * | 7/2008 | Mohammad | ................ | 358/1.15 |

* cited by examiner

*Primary Examiner* — Twyler Haskins
*Assistant Examiner* — Lennin Rodriguezgonzalez
(74) *Attorney, Agent, or Firm* — Smith, Gambrell & Russell, LLP

(57) ABSTRACT

It is an object of the present invention to provide an image forming apparatus that achieves reduction in power and resumption time by selectively resuming a function which a user desires when a storage medium in which identification information for identifying the user is stored is exposed so as to perform resumption from the energy saving state. The image forming apparatus includes: two or more functions of a copy function, a printer function, a scan function and a FAX function; a radio communication portion that performs radio communication with a storage medium in which identification information for identifying a user is stored; and a control portion that when the radio communication portion obtains the identification information from the storage medium in a case where part of the apparatus is in an energy saving state, selects a function to be resumed from the energy saving state according to an exposure state in which the storage medium is exposed to the radio communication portion.

5 Claims, 7 Drawing Sheets

IMAGE FORMING APPARATUS AND IMAGE FORMING SYSTEM

This application is based on Japanese Patent Application No. 2008-189471 filed on Jul. 23, 2008, the contents of which are hereby incorporated by reference.

BACKGROUND OF THE INVENTION

1. Field of the Invention

The present invention relates to an image forming apparatus that includes a radio communication portion which reads a storage medium such as an IC card and the like over radio communication and has two or more functions of a copy function, a printer function, a scan function, and a FAX function and relates to an image forming system.

2. Description of Related Art

In recent years, IC cards are becoming widespread and IC card authorization is employed in various apparatuses. As one of the apparatuses, there is an image forming apparatus such as a copy machine, a printer and a multi-function machine that is used in company offices. An image forming is often shared with a plurality of persons in each office or on each floor, and can be used when individuals expose their IC cards to the apparatus. Thus, the use situation of the image forming apparatus is able to be controlled individually.

As an image reader that includes a card reader, JP-A-1999-17862 discloses an image reader (FAX machine) that includes an image read means, an image transmission means, an operation means that reads an image and performs various mode settings for image transmission, a control means that controls the image read means and the image transmission means according to a setting on the operation means, a user ID recognition means, a user ID transmission means that transmits a recognized user ID to a server that stores personalize information, a personalize information acquisition means that from the sever, receives personalize information corresponding to the transmitted user ID, and a personalize means that personalizes the operation means. Because of increasing sense of environment and from the viewpoint for running-cost reduction, generally, a multi-function machine includes an energy saving state (a sleep state) for reducing power consumption. In the energy saving state, for example, if the multi-function machine is not used for a predetermined time or a key for going into the energy saving state is pushed, electricity supplied to each component in the image forming apparatus is reduced or cut off except the constituent portion for resuming the usual copy function, the scanner function and the like from the energy saving state.

However, in the image reader disclosed in JP-A-1999-17862, all the functions always resume working when returning from the energy saving state (sleep state). Accordingly, in a case where only part of the functions is used, for example, only reading with the scanner is performed, a waste occurs in the electric power (power) and time for the resumption.

SUMMARY OF THE INVENTION

The present invention has been made to deal with the conventional problems, and it is an object of the present invention to provide an image forming apparatus that achieves reduction in power and resumption time by selectively resuming a function which a user desires when a storage medium in which identification information for identifying the user is stored is exposed so as to perform resumption from the energy saving state. And it is also an object of the present invention to provide an image forming system that includes the image forming apparatus.

To achieve the object, an image forming apparatus according to the present invention includes: two or more functions of a copy function, a printer function, a scan function and a FAX function; a radio communication portion that performs radio communication with a storage medium in which identification information for identifying a user is stored; and a control portion that when the radio communication portion obtains the identification information from the storage medium in a case where part of the apparatus is in an energy saving state, selects a function to be resumed from the energy saving state according to an exposure state in which the storage medium is exposed to the radio communication portion.

According to this structure, only a function that the user desires is able to be resumed from the energy saving state.

In the above image forming apparatus, including a display portion for indicating a selection state of the function to be resumed from the energy saving state leads to convenience for the user.

In the above image forming apparatus, if the exposure state in which the storage medium is exposed to the radio communication portion is a time span in which the storage medium is exposed, it is possible to easily design a predetermined time as a threshold value and convenience for the user is high.

In the above image forming apparatus, a structure may be employed, in which all of the copy function, the printer function, the scan function and the FAX function are included, and the selection of the function to be resumed from the energy saving state is switched from the scan function and the FAX function, the printer function and to the copy function in order from a short exposure time to a long exposure time of the storage medium.

In the above image forming apparatus, if the exposure state in which the storage medium is exposed to the radio communication portion is the number of exposures of the storage medium, it is possible to easily design a predetermined number as a threshold value and convenience for the user is high.

In the above image forming apparatus, a structure may be employed, in which all of the copy function, the printer function, the scan function and the FAX function are included, and the selection of the function to be resumed from the energy saving state is switched from the scan function and the FAX function, the printer function and to the copy function in order from the small number to the large number of exposures of the storage medium.

In the above image forming apparatus, it is desirable from the viewpoint of visibility that the radio communication portion and the display portion are adjacent to each other.

An image forming system according to the present invention includes: any one of the above image forming apparatuses; and a storage medium in which identification information for identifying a user is stored.

According to the present invention, when the storage medium is exposed to the radio communication portion so as to perform resumption from the energy saving state, the function to be resumed from the energy saving state is switched according to the exposure state of the storage medium, thus the function which the user desires is able to be resumed. Here, because the necessary function only is resumed, it is possible to achieve reduction in the power consumption and resumption time.

DESCRIPTION OF THE PREFERRED EMBODIMENTS

Hereinafter, embodiments of the present invention are explained with reference to FIGS. 1 to 7. Although the present invention is applicable to various image forming apparatuses, hereinafter, as an example, a multi-function machine 1 (which corresponds to an image forming apparatus) is explained, which includes a card reader 6 (which corresponds to a radio communication portion) that identifies a user by using an IC card 7 (which corresponds to a storage medium) and determines whether or not the user has permission to use (use permission) the multi-function machine 1. The structures and arrangements described in the embodiments do not limit the scope of the present invention and are mere examples.

[Overview of Image Forming Apparatus]

Figure 1:
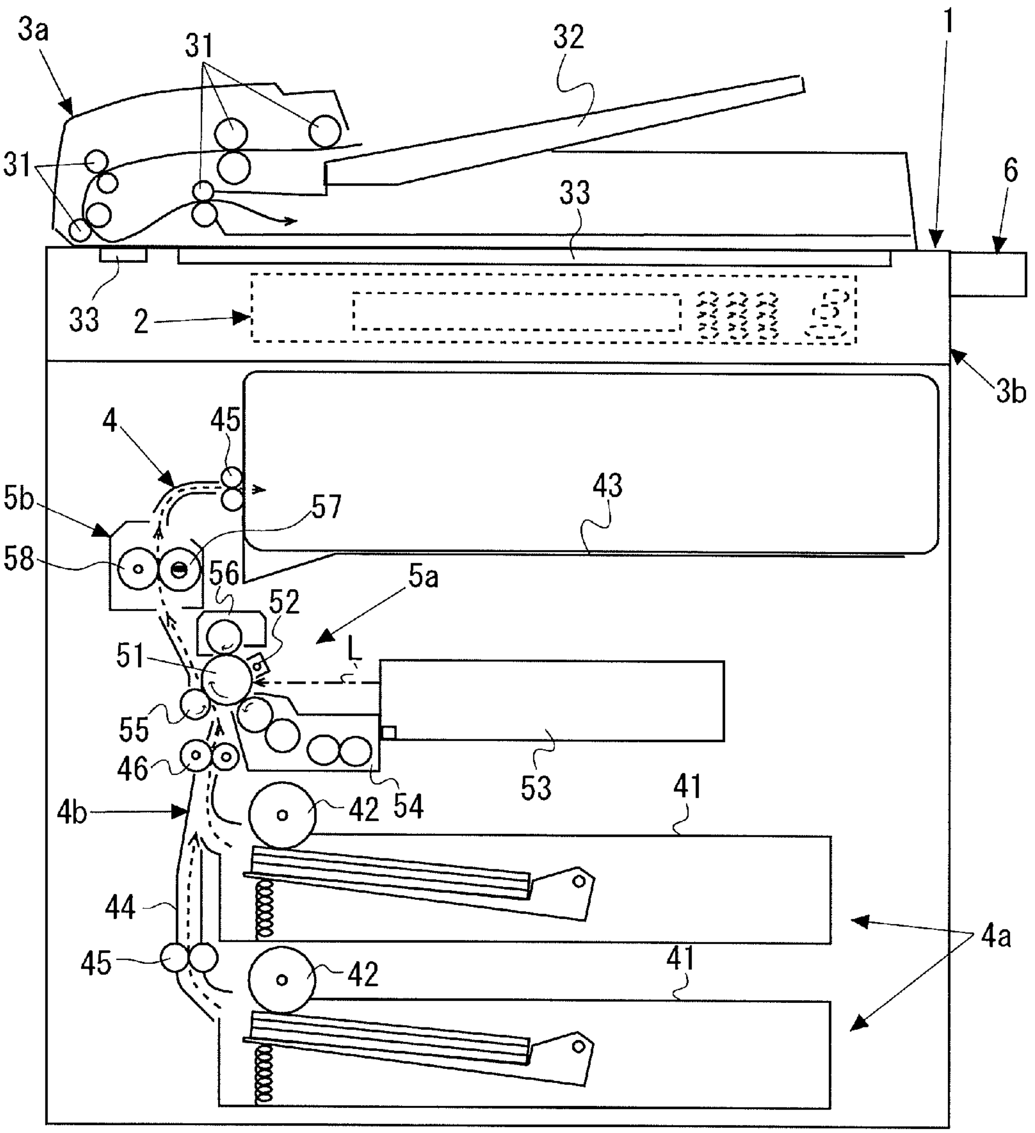
FIG. 1 is a schematic front sectional view of a multi-function machine according to the present invention.

First, the multi-function machine 1 according to an embodiment of the present invention is explained based on FIG. 1. FIG. 1 is a schematic front sectional view of the multi-function machine 1 according to the embodiment of the present invention.

As shown in FIG. 1, the multi-function machine 1 in the embodiment includes a document feed device 3*a* on the highest portion, and is equipped with an operation panel 2, a document read portion 3*b*, a paper sheet supply portion 4*a*, a paper sheet feed path 4*b*, an image forming portion 5*a*, a fixing portion 5*b*, a card reader 6 and others.

When copying documents, in response to rotation of a plurality of pairs of document feed rollers 31, the document feed device 3*a* feeds automatically and successively the documents loaded on a document load tray 32 one after another to a read position of the document read portion 3*b*. The document read portion 3*b* reads the documents and forms image data of the documents. A contact glass plate 33 is disposed on an upper surface of the document read portion 3*b*. Optical members (not shown) such as an exposure lamp, a mirror, a lens, an image sensor (e.g., a CCD) and others are disposed inside the document read portion 3*b*.

By means of these optical members, light is directed onto a document fed by the document feed device 3*a* and onto a document placed on the contact glass plate 33; an output value from each pixel of the image sensor that receives reflected light from the document undergoes A/D conversion; image data are generated and the multi-function machine 1 is able to perform printing based on the image data obtained by the reading (copy function). The document feed device 3*a* is able to be rotated and lifted about a pivotal shaft disposed along a line behind the paper surface of FIG. 1, and after a document is placed on the contact glass plate 33, the document feed device 3*a* holds the document down.

The paper sheet supply portion 4*a* stores a plurality kinds of paper sheets (e.g., copy paper, plain paper, recycled paper, thick paper, various sheets such as OHP sheets and the like) and sends one paper sheet after another to the paper sheet feed path 4*b*. The paper sheet supply portion 4*a* comprises a cassette 41 on which paper sheets to be stored are loaded, paper sheet supply rollers 42 that rotate to send out paper sheets from a cassette 41 to the paper sheet feed path 4*b*, and the like. For example, in the time of printing, the paper sheet supply rollers 42 rotate and the paper sheets for image formation are sent to the paper sheet feed path 4*b* one after another.

The paper sheet feed path 4*b* feeds paper sheets from the paper sheet supply portion 4*a* to an ejection tray 43. The image forming portion 5*a* and the fixing portion 5*b* are disposed in the paper sheet feed pathway. The paper sheet feed path 4*b* is provided with a guide 44 for guiding paper sheets, pairs of feed rollers 45 that rotate when feeding paper sheets, a pair of resist rollers 46 that force a paper sheet fed to wait before the image forming device 5*a* and sends out the paper sheet in synchronization with a timing of toner-image formation, and the like.

The image forming portion 5*a* forms a toner image based on image data and transfers the toner image onto a paper sheet fed. For this purpose, the image forming portion 5*a* comprises: a light-sensitive drum 51 that is supported rotatably in a direction indicated by an arrow shown in FIG. 1; an electrification device 52 disposed above the light-sensitive drum 51; a laser scan unit 53; a development device 54; a transfer roller 55; a cleaning device 56 and the like.

Toner-image formation and transfer processes are explained below. The light-sensitive drum 51 that is disposed in the substantially central portion of the image forming portion 5*a* and rotates in a predetermined direction is electrically charged to a predetermined potential by the electrification device 52 that is disposed at a diagonally right position above the light-sensitive drum 51 as shown in FIG. 1. In FIG. 1, the laser scan unit 53 is disposed to the right side of the electrification device 52, outputs laser light L based on image data, scans the surface of the light-sensitive drum 51 for exposure so as to form a latent image corresponding to the image data. As for the image data, image data obtained by the document read portion 3*b* or image data transmitted from a user terminal 100 connected to a network or the like or from a communication party FAX machine 200 (see FIG. 2) are used. In FIG. 1, the development device 54 that is disposed at a diagonally right position below the light-sensitive drum 51 supplies toner to the electrostatic latent image formed on the light-sensitive drum 51 to develop an image. The transfer roller 55 that is disposed left below the light-sensitive drum 51 is pressurized to the light-sensitive drum 51 to form a nip. A paper sheet is carried into the nip in synchronization with the timing with the toner image. When the paper sheet goes into the nip, a predetermined electric voltage is applied to the transfer roller 55 and the toner image on the light-sensitive drum 51 is transferred to the paper sheet. The cleaning device 56 removes toner remaining on the light-sensitive drum 51 after the transfer.

The fixing portion 5*b* fixes the toner image transferred to the paper sheet. The fixing portion 5*b* in the embodiment is constituted chiefly with a pressurization roller 58 and a heat roller 57 that incorporates a heating unit. The heat roller 57 and the pressurization roller 58 come into a tight contact with each other to form a nip. When a paper sheet passes through the nip, the toner on the paper sheet surface is heated to melt and fixed on the paper sheet. The paper sheet after the toner fixing is received by the ejection tray 43. Thus, the image formation (printing) is carried out in the time of using the copy function or the printer function.

Although the details are described later, the card reader 6 is disposed on an right upper portion of the multi-function machine 1 in the embodiment. The card reader 6 uses an electric wave (electromagnetic wave) to perform radio communication with the IC card 7 (which corresponds to the storage medium) that stores identification information for identifying a user, thereby carrying out transmission and reception of data stored in the IC card 7. Identification information that is data for recognizing and identifying the user who owns the IC card 7 is stored in the IC card 7. As the identification information, data for identifying each person such as an employee ID, a section name and the like can be used. Besides, if necessary, specific company information (company name) and the addresses of predetermined web sites (e.g., the addresses of web sites for weather forecast and news) are also stored in the IC card 7.

The user needs only to be identified to put the present invention into practical use. However, in the multi-function machine 1 according to the present embodiment, besides user identification, it is checked whether or not the user of the IC card 7 has permission to use the multi-function machine 1 by using the identification information obtained by the card reader 6. Thus, the use control of the multi-function machine 1 is performed.

Figure 2:
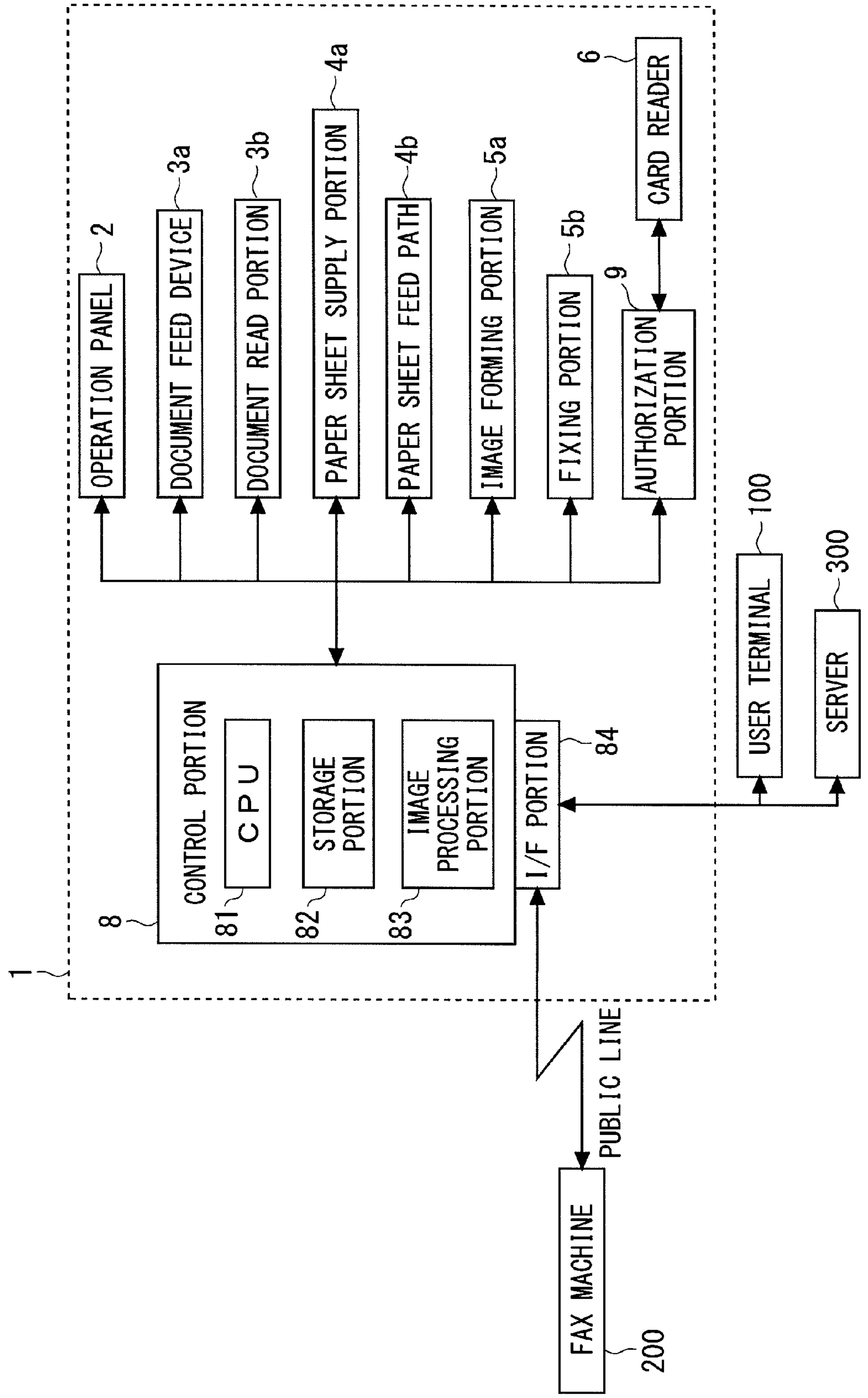
FIG. 2 is a block diagram showing a structural example of a multi-function machine according to the present invention.

Next, a hardware structure of the multi-function machine 1 according to the embodiment of the present invention is explained based on FIG. 2. FIG. 2 is a block diagram showing a structural example of the multi-function machine 1 according to the embodiment of the present invention.

A control portion 8 is disposed in the multi-function machine 1. The control portion 8 controls operation of the multi-function machine 1 and is composed of, for example, a CPU 81, a storage portion 82, an image processing portion 83 and the like.

The CPU 81 is the central processing unit and controls each portion of the multi-function machine 1 based on control programs that are stored and executed in the storage portion 82. Besides the CPU 81, another CPU for display control of the operation panel 2 may be built into the operation panel 2 or the like. The image processing portion 83 applies various image processing operations to image data for printing and to image data that are transmitted to the user terminal 100 or the communication party FAX machine 200.

The storage portion 82 is constituted by a combination of a non-volatile storage device and a volatile storage device such as a ROM, a RAM, a HDD and the like. The storage portion 82 is able to store various data such as the control programs of the multi-function machine 1, control data, setting data, image data and the like. Besides, if necessary, advertising information corresponding to specific company information (company name), the addresses of predetermined web sites in the Internet, states of the image forming apparatus such as a jam rate and the remaining amount of paper sheets, a use history (e.g., the number of paper sheets used) for each identification information are able to be stored.

The control portion 8 is connected to portions such as the operation panel 2, the document feed device 3*a*, the document read portion 3*b*, the paper sheet supply portion 4*a*, the paper sheet feed path 4*b*, the image forming portion 5*a* and the fixing portion 5*b* over signal lines and the like, and controls operation of the multi-function machine 1. An authorization portion 9 is connected to the control portion 8. The authorization portion 9 is able to be achieved as hardware or software with the CPU 81, the storage portion 82 and programs of the control portion 8.

The authorization portion 9 is connected to the card reader 6. The authorization portion 9 compares identification information that is stored in the IC card 7 and is obtained by the card reader 6 with the data (hereinafter, called "authorization data") that the authorization portion 9 has and uses to determine whether or not it is possible for the user to use the multi-function machine 1 (whether or not the user has permission to use the multi-function machine 1), and determines whether or not the user is eligible. For example, the authorization portion 9 stores the identification information, as the authorization data, stored in all the IC cards owned by the users who have use permission. In authorization operation, the authorization portion 9 checks whether or not there are authorization data identical to the identification information obtained from the IC card 7. In other words, based on the identification information in the IC card 7, the authorization portion 9 determines whether or not the user has use permission and there is a problem to give permission to the user to use the multi-function machine 1.

Here, the control portion 8 of the multi-function machine 1 according to the embodiment keeps the multi-function machine 1 in an unavailable state in principle. For example, in the unavailable state, even if operation or input for copy or FAX transmission is carried out on the operation panel 2, the control portion 8 does not accept such operation command input. Besides, even if image data are transmitted from the user terminal 100, the control portion 8 does not perform printing; and even if the control portion 8 temporarily saves the image data into the storage portion 82 or the like, the control portion 8 does not perform printing. Thus, the multi-function machine 1 is able to put limits on the user, identify the user, and carry out the use control of the multi-function machine 1.

On the other hand, an authorization result that represents no problem giving use permission to the user is sent to the control portion 8. The control portion 8 receives the authorization result and puts the multi-function machine 1 into an available state. In other words, if an authorization result representing that the owner of the IC card 7 has use permission is transmitted from the authorization portion 9 (the IC card 7 proves to be owned by the user who has the use permission), the multi-function machine 1 becomes available. Here, the use history such as the number of paper sheets used for printing, the day and time of use and the like are obtained, and the information (e.g., the identification information) for identifying the user is also transmitted from the authorization portion 9 together with the use history. The control portion 8 saves the use history into the storage portion 82 or the like.

Besides, the control portion 8 is connected to an I/F portion 84 (an interface portion) that comprises various connectors, sockets and the like. The I/F portion 84 is connected to a plurality of user terminals 100 and a communication party FAX machines 200 over a network or a public line, and is able to transmit, for example, image data to the user terminal 100 and the communication party FAX machine 200 (an Internet FAX may be used) (the scan function and the FAX function). Besides, the I/F portion 84 is able to perform printing based on image data transmitted from the user terminal 100 and the communication party FAX machine 200 (the printer function and the FAX function). In other words, the multi-function machine 1 has two or more functions of the copy function, the printer function, the scan function, and the FAX function. In addition, by using the I/F portion 84, it is possible to connect the multi-function machine 1 to a server 300 in a network and store, for example, data of each user into the server 300.

Figure 3:
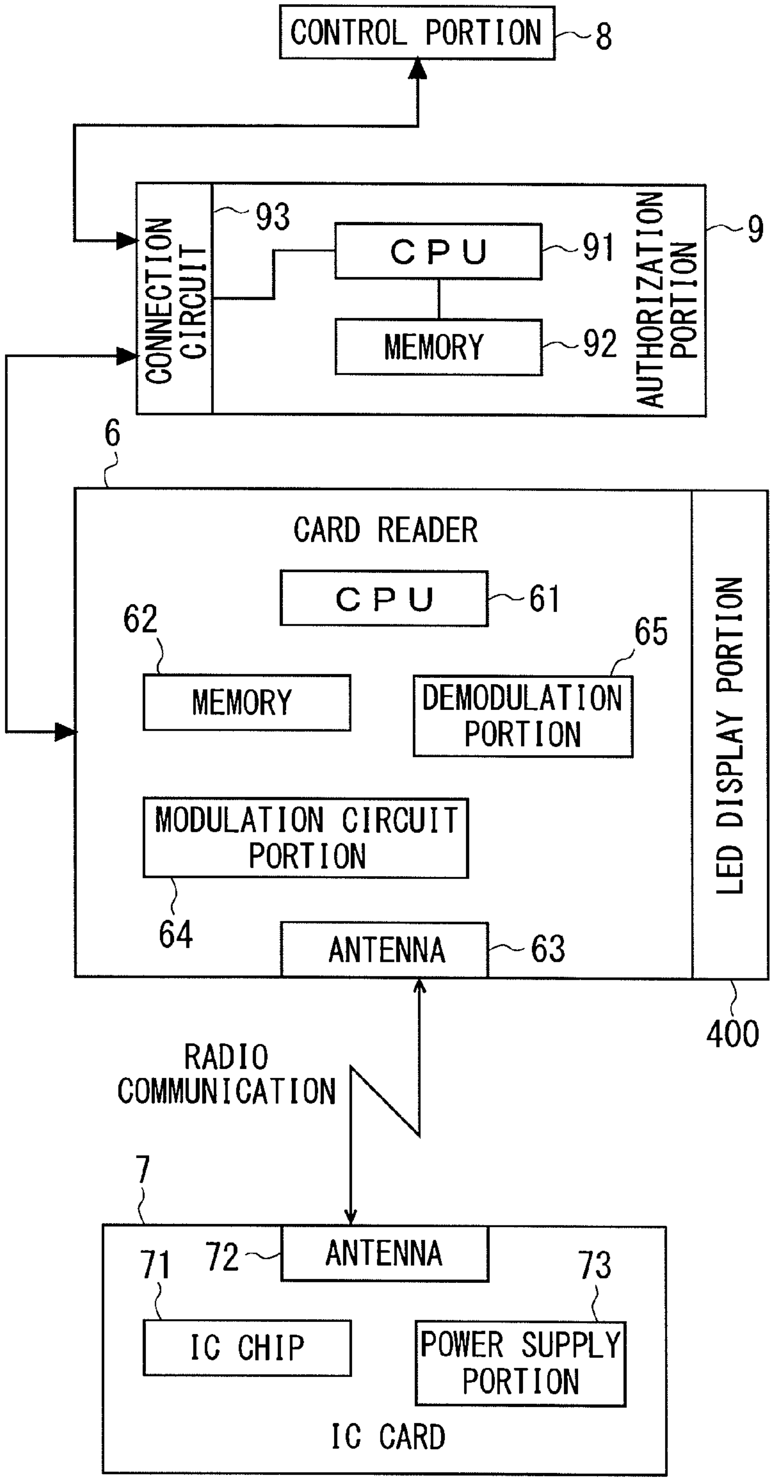
FIG. 3 is a block diagram showing a structural and connection example of an authorization portion, a card reader, and an IC card.

[Structures of the Card Reader 6, the IC Card 7 and the Authorization Portion 9]Next, the card reader 6, the IC card 7 and the authorization portion 9 in the embodiment of the present invention are described in detail based on FIG. 3. FIG. 3 is a block diagram showing structural and connection examples of the authorization portion 9, the card reader 6, and the IC card 7 according to the embodiment of the present invention.

As shown in FIG. 3, in the multi-function machine 1 according to the embodiment, the authorization portion 9 is connected between and in series with the control portion 8 and the card reader 6. Thus, an authorization system for the IC card 7 is structured. Hereinafter, each component is described.

The multi-function machine 1 is equipped with the card reader 6. As described above, the card reader 6 performs radio communication with the IC card 7 over an electromagnetic wave (an electric wave). The card reader 6 includes a CPU 61, a memory 62, an antenna 63, a modulation circuit portion 64, a demodulation portion 65 and the like.

The CPU 61 controls operation of the card reader 6 and performs communication control and various operations by using control programs and control data that are stored in the memory 62. The antenna 63 emits an electric wave (an electromagnetic wave) and receives an electric wave (a reflected wave and the like) from the IC card 7 for radio communication with the IC card 7. The modulation circuit portion 64 modulates a carrier wave to put a signal wave on the carrier wave and sends out the modulated wave. The modulation circuit portion 64 performs amplitude modulation, frequency modulation, phase modulation and the like that are in conformity with the modulation/demodulation which is employed for the communication between the card reader 6 and the IC card 7. The demodulation portion 65 demodulates a signal wave from the IC card 7 and obtains data signals such as identification information and the like transmitted from the IC card 7.

An LED display portion 400 is disposed adjacently to the card reader 6. The LED display portion 400 indicates a selection state of functions to be resumed from the energy saving state by turning on LEDs.

Figure 4:
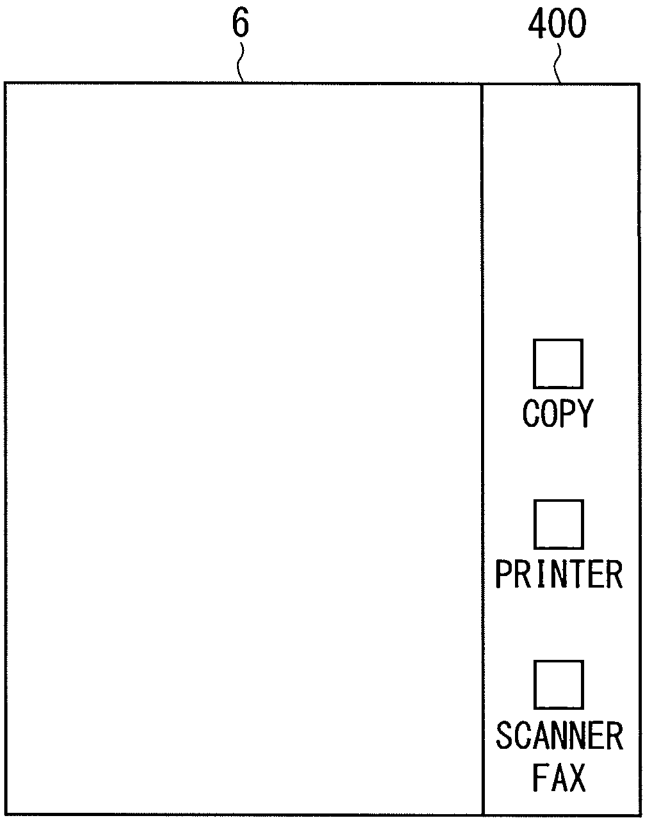
FIG. 4 is a plan view of a card reader.

A plan view of the card reader 6 and the LED display portion 400 is shown in FIG. 4. In FIG. 4, three LEDs are arranged, which go on to indicate the selection of the scan function and the FAX function, the printer function, and the copy function in order from the bottom, respectively. Instead of the LEDs, a liquid crystal panel or the like may be used.

Next, the IC card 7 that stores identification information used for user identification is explained. The IC card 7 includes an IC chip 71 that incorporates a control operation circuit, a modem circuit, a memory and the like, an antenna 72 and a power-supply source 73. The IC chip 71 stores at least identification information. The IC card 7 receives an instruction from the card reader 6 over radio communication and transmits identification information stored in the IC chip 71 to the card reader 6. As the IC card 7, it is possible to use a passive-type IC card, which receives a carrier wave transmitted from the card reader 6, rectifies the carrier wave by using the power-supply source 73, uses the rectified wave as a power supply source to drive the IC chip 71, puts stored data on a reflected wave and transmits the data via the antenna 72 to the card reader 6.

The IC card 7 is also able to receive data and an instruction from the card reader 6 and perform writing and updating of data in the memory of the IC chip 71. In this case, the card reader 6 serves as a card writer.

The authorization portion 9 that is connected to the card reader and to the control portion 8 comprises a CPU 91, a memory 92, and a connection circuit 93, and is able to carry out transmission and reception of data to and from the card reader 6 and the control portion 8. The CPU 91 controls operation of the authorization portion 9. The memory 92 stores the control programs for control of the authorization portion 9, authorization data and the like. The CPU 91 compares identification information stored in the IC card 7 that is read by the card reader 6 and is transmitted to the authorization portion 9 with the authorization data that are stored in the memory 92, and checks whether or not there are data in the authorization data that are identical to the identification information. If there are data identical to the identification information, the CPU 91 transmits a signal representing use permission of the multi-function machine 1 and the user identification information such as the identification information identical to the authorization data to the control portion 8.

Figure 5:
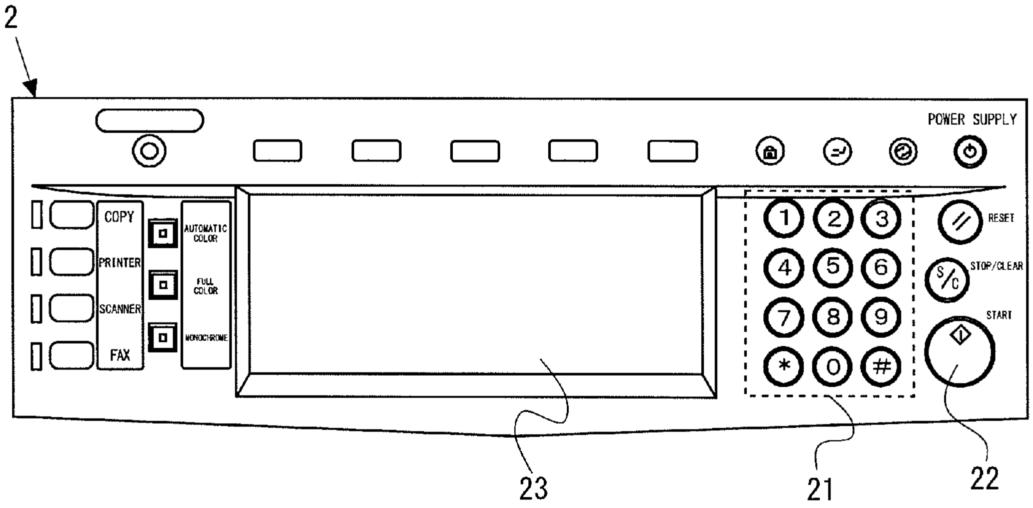
FIG. 5 is a view showing an example of an operation panel of a multi-function machine according to the present invention.

FIG. 5 is an example of the an operation panel 2 according to the embodiment of the present invention. As shown in FIG. 5, the operation panel 2 disposed on a front upper portion of the multi-function machine 1 comprises a ten-key portion 21 and various keys for inputting such as a start key 22 and the like. Besides, the operation panel 2 comprises a liquid crystal display portion 23 that displays operation states and various information of the apparatus, and allows a mode selection and the like through a touch panel.

By operating the operation panel 2, it is possible to newly register or update the user having use permission. In this case, for example, various kinds of data (e.g., the personal name, the section name, the address of the user terminal 100 and the like) for identifying the user who uses the multi-function machine 1 are input via the operation panel 2. Identification information is generated from the various data, the generated identification information is added to the information in the storage portion 82 and the memory 92 of the authorization portion 9 as authorization data. Besides, the card reader 6 is used as a card writer so as to store the identification information into the IC card 7 or to update the information in the IC card 7. In other words, it is possible to newly register the IC card 7. In a case where the IC card 7 is already used as an employee card in a company or a personal ID card, an operation may be performed, in which the card reader 6 reads the employee card or the personal ID card, and the information read is stored into the storage portion 82 and the memory 92 of the authorization portion 9 as authorization data. Thus, it is possible to control the use of the multi-function machine 1 without preparing a new IC card 7.

An operation may be performed, in which the LED display portion shown in FIG. 4 is not used; and a selection state of a function to be resumed from the energy saving state is displayed on the liquid crystal display portion 23.

Next, a resumption operation that is performed when the IC card 7 is exposed to the card reader 6 in the time of the energy saving state is explained. The energy saving state in the embodiment means a state in which electricity supply to the operation panel 2, the document feed device 3*a*, the document read portion 3*b*, the paper sheet supply portion 4*a*, the paper sheet feed path 4*b*, the image forming portion 5*a*, the fixing portion 5*b*, the image processing portion 83 and the I/F portion 84 is curbed or cut off.

Figure 6:
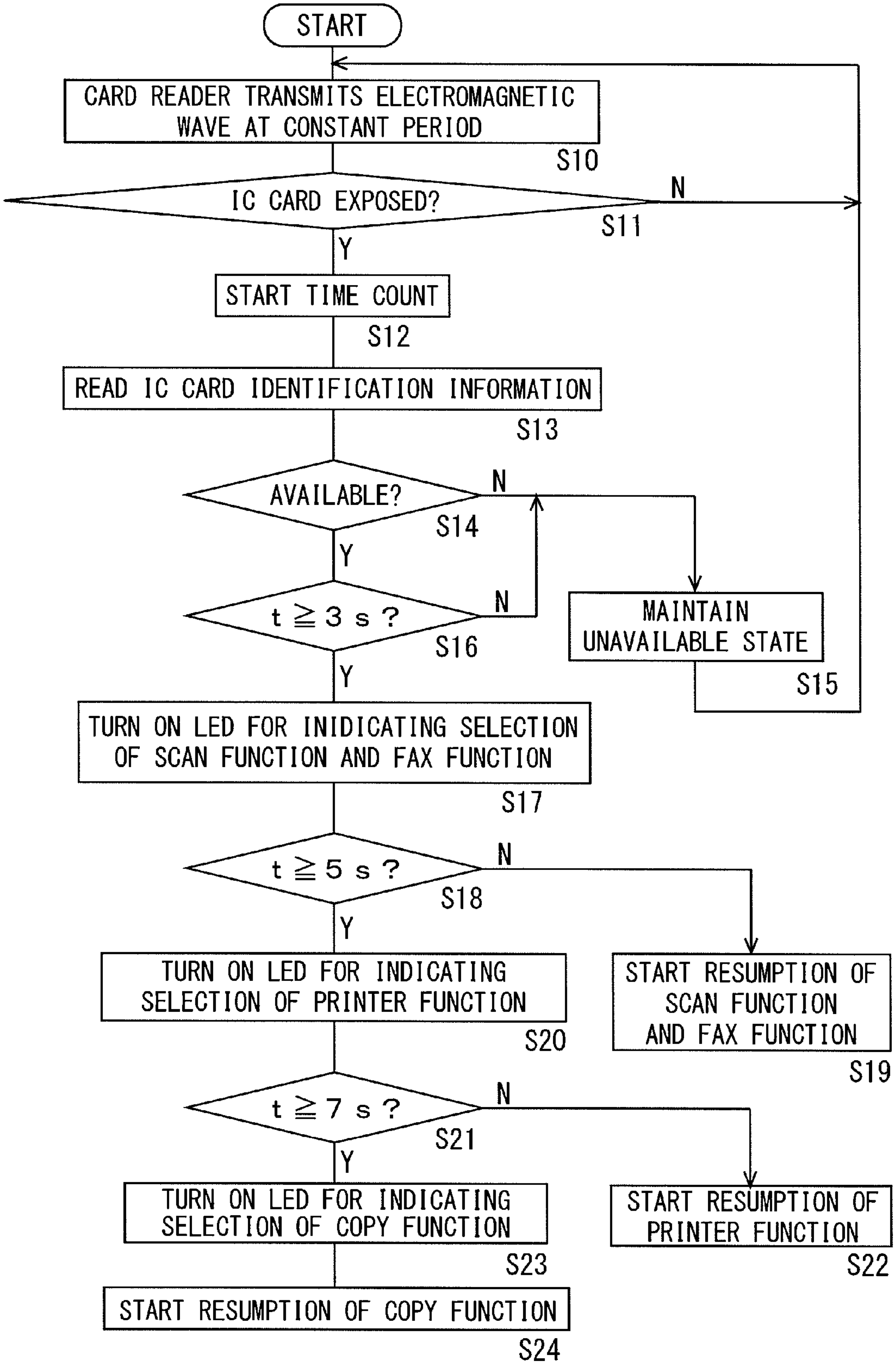
FIG. 6 is a flow chart showing operation of a first example of a multi-function machine when an IC card in the present invention is exposed.

FIG. 6 is a flow chart showing operation of a first example of the multi-function machine 1 when the IC card 7 is exposed. First, at the START in FIG. 6, the multi-function machine 1 has no users and is in the unavailable and energy saving state. Here, to detect that the IC card 7 is exposed to the card reader 6, the card reader 6 emits an electromagnetic wave (an electric wave) at constant periods in the step S10, and checks whether or not the IC card 7 is exposed in the step S11.

The multi-function machine 1 keeps the unavailable state until the IC card 7 is exposed to the card reader 6 (No in the step S11).

If the IC card 7 is exposed to the card reader 6 in the step S11, the processing proceeds to the step S12 and a time span t during which the IC card is exposed is counted. For the time count, a time check means that the control portion 8 or the like includes may be used. The time span t is a time during which the state of the IC card 7 being exposed to the card reader 6 is maintained.

Then, proceeding to the step S13, the card reader 6 reads identification information from the IC card 7, and in the step S14, the authorization portion 9 checks based on the identification information whether or not there is a problem permitting the user to use the multi-function machine 1. If there are no data in the identification data stored in the authorization portion 9 that are identical to the obtained identification information, the control portion 8 maintains the unavailable state of the multi-function machine 1 in the step S15 and returns to the step S10.

On the other hand, if the authorization portion 9 determines that there is no problem permitting the use of the multi-function machine 1 in the step S14, the result and the data for identifying the user are transmitted to the control portion 8. In the step S16, the control portion 8 determines whether or not the time t reaches 3 seconds or longer, that is, the IC card 7 is kept being exposed to the card reader 6 for 3 seconds or longer.

If the time t is shorter than 3 seconds in the step S16, that is, the time t during which the IC card 7 is exposed to the card reader 6 is shorter than 3 seconds, the control portion 8 maintains the unavailable state of the multi-function machine 1 in the step S15 and returns to the step S10.

On the other hand, if the time t is 3 seconds or longer in the step S16, that is, the IC card is kept being exposed to the card reader 6 for 3 seconds or longer, the LED for indicating the selection of the scan function and the FAX function is turned on in the step S17. Thus, the user is able to understand that the scan function and the FAX function resumes if the user moves the IC card 7 away from the card reader 6.

Next, proceeding from the step S17 to the step S18, the control portion 8 determines whether or not the time t reaches 5 seconds or longer. If the time t is shorter than 5 seconds in the step S18, that is, the time t during which the IC card 7 is exposed to the card reader 6 is longer than 3 seconds and shorter than 5 seconds, the control portion 8 proceeds to the step S19 and starts the resumption operation of the scan function and the FAX function. Specifically, the operation panel 2, the document feed device 3*a*, the document read portion 3*b*, the image processing portion 83, and the I/F portion 84 shown in FIG. 2 are made resume. Because these components quickly resume upon being turned on, it is possible to use them immediately. Here, the paper sheet supply portion 4*a*, the paper sheet feed path 4*b*, the image forming portion 5*a* and the fixing portion 5*b* that are not used for the scan function and the FAX function maintain the energy saving state.

On the other hand, if the time t is 5 seconds or longer in the step S18, that is, the IC card 7 is kept being exposed to the card reader 6 for 5 seconds or longer, the LED for indicating the selection of the scan function and the FAX function is turned off and the LED for indicating the selection of the printer function is turned on in the step S20. Thus, the user is able to understand that the printer function resumes if the user moves the IC card 7 away from the card reader 6.

Next, proceeding from the step S20 to the step S21, the control portion 8 determines whether or not the time t reaches 7 seconds or longer. If the time t is shorter than 7 seconds in the step S21, that is, the time t during which the IC card 7 is exposed to the card reader 6 is longer than 5 seconds and shorter than 7 seconds, the control portion 8 proceeds to the step S22 and starts the resumption operation of the printer function. Specifically, the paper sheet supply portion 4*a*, the paper sheet feed path 4*b*, the image forming portion 5*a*, the fixing portion 5*b*, the image processing portion 83 and the IF portion 84 shown in FIG. 8 are made resume. Here, it is the fixing portion 5*b* that determines the resumption time.

Here, the operation panel 2, the document feed device 3*a* and the document read portion 3*b* that are not used for the printer function maintain the energy saving state. To resume the scan function and the FAX function from a state in which only the printer function is resumed, for example, if the scan function and the FAX function are selected on the operation panel 2 after the operation panel is operated to resume, the document feed device 3*a* and the document read portion 3*b* are resumed. Because the document feed device 3*a* and the document read portion 3*b* do not require a long time to resume, it is possible to use them immediately.

On the other hand, if the time t is 7 seconds or longer in the step S21, that is, the IC card 7 is kept being exposed to the card reader 6 for 7 seconds or longer, the LED for indicating the selection of the printer function is turned off and the LED for indicating the copy function is turned on in the step S23. Thus, the user is able to understand that the copy function resumes if the user moves the IC card 7 away from the card reader 6.

Then, proceeding from the step S23 to the step S24, the resumption operation of the copy function is started. Specifically, the operation panel 2, the document feed device 3*a*, the document read portion 3*b*, the paper sheet supply portion 4*a*, the paper sheet feed path 4*b*, the image forming portion 5*a*, the fixing portion 5*b* and the image processing portion 83 are made resume. Here, it is the fixing portion 5*b* that determines the resumption time.

As described above, when the IC card 7 is exposed to the card reader 6 for resumption from the energy saving state, it is possible to selectively resume the function that the user desires by switching the scan function and the FAX function, the printer function and the copy function in order from a short time to a long time of the exposure of the IC card 7. Here, because only the necessary component is resumed, it is possible to achieve reduction in the power consumption and resumption time.

Here, there is no special constraints on the threshold values of the time t used in the above steps S16, S18 and S21, and for example, other conditions may be used, that is, t>0 in the step S16, t>3 in the step S18, and t>5 (seconds) in the step S21. In this case, the processing does not proceed from the step S16 to the step S14, and the LED for indicating the selection of the scan function and the FAX function is turned on as soon as the IC card 7 is exposed to the card reader 6. The threshold values of the time t are able to be freely set by the installer of the apparatus.

Besides, in the embodiment, if the IC card 7 is exposed to the card reader 6 for 7 seconds or longer, the copy function is resumed. However, the LED for indicating the selection of the scan function and the FAX function may be turned on again if the IC card 7 is exposed to the card reader for 9 seconds.

Figure 7:
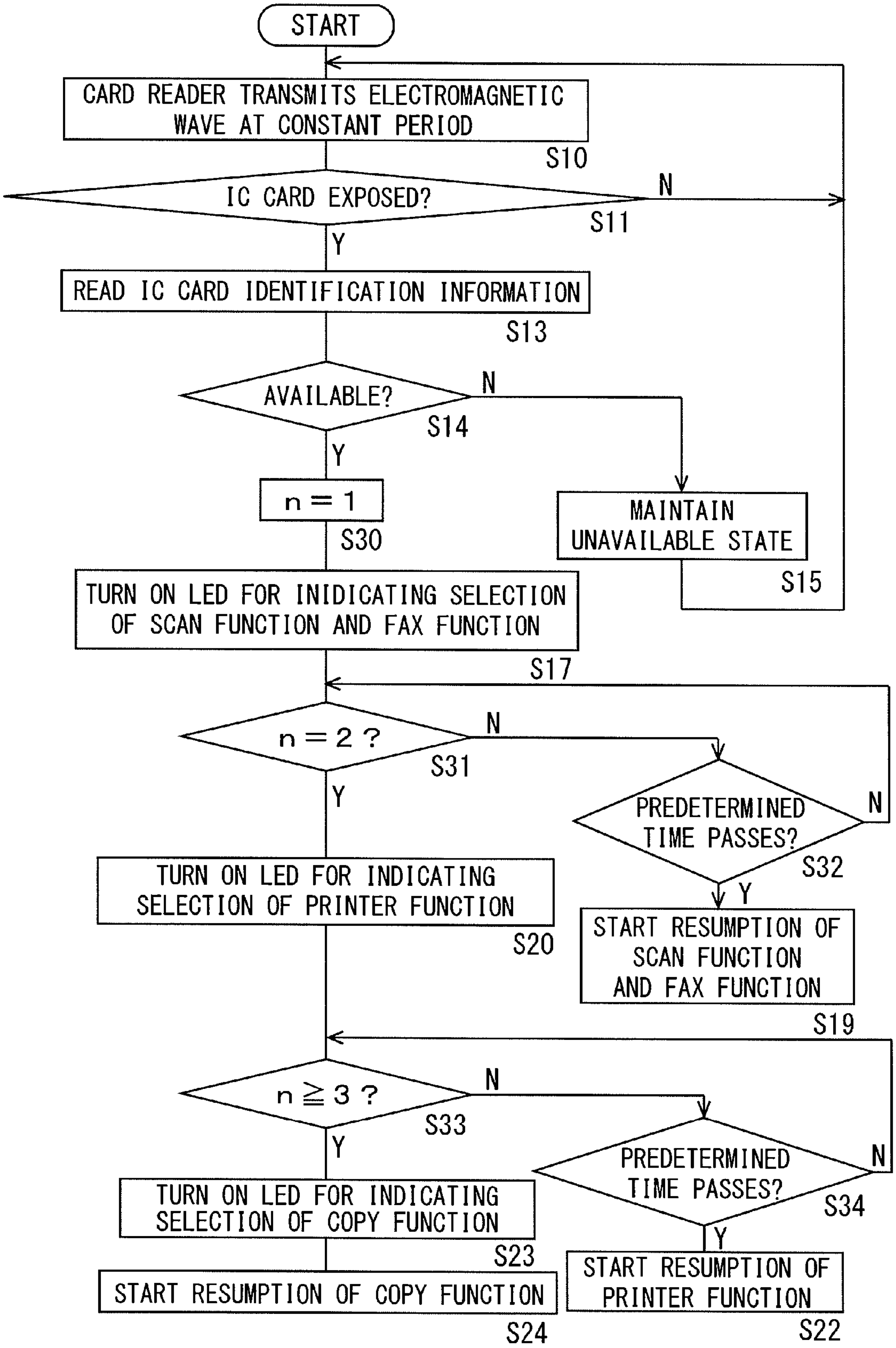
FIG. 7 is a flow chart showing operation of a second example of a multi-function machine when an IC card in the present invention is exposed.

FIG. 7 is a flow chart showing operation of a second example of the multi-function machine 1 when the IC card 7 is exposed. The same steps as those in FIG. 6 are indicated by the same reference numbers and the explanation of them is skipped.

Proceeding from the step S10 to the step S11, if the IC card 7 is exposed to the card reader 6, the card reader 6 reads identification information from the IC card 7 in the step S13, and in the step S14, the authorization portion 9 checks based on the identification information whether or not there is a problem permitting the owner of the IC card 7 to use the multi-function machine 1. If there are no data in the identification data stored in the authorization portion 9 that are identical to the obtained identification information, the control portion 8 maintains the unavailable state of the multi-function machine 1 in the step S15 and returns to the step S10.

On the other hand, if the authorization portion 9 determines that there is no problem permitting the use of the multi-function machine 1 in the step S14, the result and the data for identifying the user are transmitted to the control portion 8. Then the control portion 8 proceeds to the step S30 and determines that the number of exposures of the IC card 7 to the card reader 6 is 1 and proceeds to the step S17 so as to turn on the LED for indicating the selection of the scan function and the FAX function. Thus, the user is able to understand that the scan function and the FAX function resume if the user waits for a while.

Next, proceeding from the step S17 to the step S31, the control portion 8 determines whether or not the number n of exposures of the IC card 7 to the card reader 6 is 2. If the number n is still 1 in the step S31, it is determined in the step S32 whether or not a predetermined time (e.g., 2 seconds) elapses from the time the number n becomes 1. If the predetermined time does not elapse in the step S32, the processing returns to the step S31. If the predetermined time elapses in the step S32, it is determined that the user desires to expose the IC card 7 only once and the resumption operation of the scan function and the FAX function is started in the step S19.

On the other hand, if the number n is 2 in the step S31, the LED for indicating the selection of the scan function and the FAX function is turned off and the LED for indicating the selection of the printer function is turned on in the step S20. Thus, the user is able to understand that the printer function resumes if the user waits for a while.

Next, proceeding from the step S20 to the step S33, the control portion 8 determines whether or not the number n of exposures of the IC card 7 to the card reader 6 is 3 or more. If the number n is still 2 in the step S33, it is determined in the step S34 whether or not a predetermined time (e.g., 2 seconds) elapses from the time the number n becomes 2. If the predetermined time does not elapse in the step S34, the processing returns to the step S33. If the predetermined time elapses in the step S34, it is determined that the user desires to expose the IC card 7 only two times and the resumption operation of the printer function is started in the step S22.

On the other hand, if the number n is 3 or more in the step S33, the LED for indicating the selection of the printer function is turned off and the LED for indicating the selection of the copy function is turned on in the step S23. Thus, the user is able to understand that the copy function resumes if the user waits for a while. Then, proceeding from the step S23 to the S24, the resumption operation of the copy function is started.

As described above, when the IC card 7 is exposed to the card reader 6 for resumption from the energy saving state, it is possible to selectively resume the function that the user desires by switching the scan function and the FAX function, the printer function and the copy function in order from the small number to the large number of exposures of the IC card 7. Here, because only the necessary component is resumed, it is possible to achieve reduction in the power consumption and resumption time.

Here, there is no special constraints on the threshold values of the number n used in the above steps S31 and S33.

Besides, in the embodiment, if the IC card 7 is exposed to the card reader 6 three times or more, the copy function is resumed. However, the LED for indicating the selection of the scan function and the FAX function may be turned on again if the IC card 7 is exposed to the card reader 6 four times. The way of operation is able to be freely set by the installer of the apparatus.

In the above first example, the function is switched from the scan function and the FAX function, the printer function and to the copy function in order from a short time to a long time of the exposure of the IC card 7; and in the second example, the function is switched from the scan function and the FAX function, the printer function and to the copy function in order from the small number to the large number of exposures of the IC card 7. However, the function may be switched in any order, and the switch order is able to be freely set by the installer of the apparatus.

The image forming apparatus according to the present invention needs only to be an apparatus that includes two or more functions of the copy function, the printer function, the scan function, and the FAX function.

The present invention is applicable to an image forming system that includes a storage medium such as an IC card and the like; and an image forming apparatus such as a printer, a copy machine and a multi-function machine that has the card reader 6 for reading the storage medium over radio communication.

What is claimed is:

1. An image forming apparatus having two or more of a copy function, a printer function, a scan function, and a FAX function, the apparatus comprising:
 - a radio communication portion that performs radio communication with a storage medium in which identification information for identifying a user is stored;
 - a control portion that when the radio communication portion obtains the identification information from the storage medium in a case where part of the apparatus is in an energy saving state, selects a function to be resumed from the energy saving state according to a time span or a number of exposures during which the storage medium is exposed to the radio communication portion, and selects for resumption of operation, only the structure in the image forming apparatus that is necessary for resuming the function selected; and
 - a display portion that displays a selected state of a function to be resumed from the energy saving state by turning on a LED which corresponds to the function to be resumed.

2. The image forming apparatus according to claim 1, wherein all of the copy function, the printer function, the scan function and the FAX function are included, and the selection of the function to be resumed from the energy saving state is switched from the scan function and the FAX function, the printer function and to the copy function in order from a short exposure time to a long exposure time of the storage medium.

3. The image forming apparatus according to claim 1, wherein all of the copy function, the printer function, the scan function and the FAX function are included, and the selection of the function to be resumed from the energy saving state is switched from the scan function and the FAX function, the printer function and to the copy function in order from a small number to a large number of exposures of the storage medium.

4. The image forming apparatus according to claim 1, wherein the radio communication portion and the display portion are adjacent to each other.

5. An image forming system comprising: the image forming apparatuses described in claim 1; and a storage medium in which identification information for identifying a user is stored.

* * * * *